(12) United States Patent
Liesenhoff

(10) Patent No.: US 6,688,332 B2
(45) Date of Patent: Feb. 10, 2004

(54) MULTIWAY VALVE FOR SWITCHING A FLOW OF FLUID UNDER PRESSURE WITH PARALLEL DISPOSITION OF VALVE BORES, AND VALVE ASSEMBLY KIT

(75) Inventor: Thomas Liesenhoff, Hannover (DE)

(73) Assignee: Rexroth Mecman GmbH, Hannover (DE)

( * ) Notice: Subject to any disclaimer, the term of this patent is extended or adjusted under 35 U.S.C. 154(b) by 0 days.

(21) Appl. No.: 10/058,649

(22) Filed: Jan. 28, 2002

(65) Prior Publication Data

US 2002/0117217 A1 Aug. 29, 2002

(30) Foreign Application Priority Data

Feb. 26, 2001 (DE) .......................... 101 09 206

(51) Int. Cl.[7] .............................. F15B 13/042
(52) U.S. Cl. .............. 137/596.16; 91/465; 137/596.18; 137/869
(58) Field of Search ...................... 91/465; 137/596.16, 137/596.17, 596.18, 869, 870

(56) References Cited

U.S. PATENT DOCUMENTS

| 2,630,828 | A | * | 3/1953 | Bent .......................... 91/465 |
| 3,376,892 | A | | 4/1968 | Stacey |
| 3,530,886 | A | * | 9/1970 | Zoya .......................... 137/869 |
| 3,646,968 | A | | 3/1972 | Binkley et al. |
| 4,071,046 | A | * | 1/1978 | Cates ..................... 137/596.16 |
| 4,718,451 | A | * | 1/1988 | Kosugi ................... 137/596.18 |
| 6,145,541 | A | * | 11/2000 | Hirota .................... 137/596.18 |

FOREIGN PATENT DOCUMENTS

| DE | 36 37 345 A | 3/1988 |
| DE | 36 44 977 A1 | 6/1988 |
| DE | 42 38 237 A1 | 5/1994 |
| DE | 44 00 760 A1 | 7/1995 |
| EP | 1 035 331 A | 9/2000 |
| FR | 2 303 216 A | 10/1976 |

* cited by examiner

Primary Examiner—Gerald A. Michalsky
(74) Attorney, Agent, or Firm—Henry M. Feiereisen

(57) ABSTRACT

A multiway valve for controlling a flow of fluid under pressure, includes a valve housing having fluid ports and a plurality of bores in side-by-side parallel disposition substantially at a same level. Each bore is configured for accommodation of a valve spools which are sealed in the bores against the valve housing. The spools have opposite first and second end faces, and include portions of greater diameter and portions of smaller diameter. Acting on the first end face of the spools is an actuation unit for moving the spools in a longitudinal direction to thereby direct a flow of fluid under pressure between the ports, whereas a mechanical coupling mechanism, which is secured to the valve housing, interacts with the second end faces of the spools.

14 Claims, 3 Drawing Sheets

MULTIWAY VALVE FOR SWITCHING A FLOW OF FLUID UNDER PRESSURE WITH PARALLEL DISPOSITION OF VALVE BORES, AND VALVE ASSEMBLY KIT

CROSS-REFERENCES TO RELATED APPLICATIONS

This application claims the priority of German Patent Application Serial No. 101 09 206.7, filed Feb. 26, 2001, the subject matter of which is incorporated herein by reference.

BACKGROUND OF THE INVENTION

The present invention relates, in general, to directional control valves for directing a flow of fluid under pressure to a point of application, and more particularly to a pneumatic multiway valve of a type having a valve housing provided with outer ports for controlling the fluid flow between the ports.

German Pat. No. 44 00 760 A1 discloses a multiway valve which has a valve housing formed interiorly with a valve bore which extends axially through the valve housing and includes grooves for receiving sealing rings in axially spaced-apart disposition. Mounted in the valve bore is a valve spool arrangement which is moveable in a longitudinal direction by a pilot piston, when the pilot piston is acted upon by a control pressure, so as to regulate the supply of fluid under pressure to two outer working ports. The sealing principle involved here is static as the sealing rings are retained by the valve housing. Another sealing concept is known in which the sealing rings are held within grooves by the valve spool.

The valve spool arrangement according to German Pat. No. 44 00 760 A1 includes two separate valve spools, whereby each valve spool interacts with one of both separate working ports. The valve spools are jointly arranged behind one another in coaxial disposition in the valve bore, which extends continuously from one end to the other end, and are moveable in longitudinal direction independently from one another, when acted upon respectively by a control pressure. In this manner, the function of two separate multiway valves can be realized in a single valve housing. Each of the two valve spools is able to carry out in the common valve housing a 3/2 way valve function, whereby each valve spool has its own vent port and both valve spools communicate with a common supply port adjacent to the confronting ends of the valve spools in mid-section of the valve bore.

This conventional multiway valve can also be modified by replacing the two valve spools with a single-piece valve spool which is fitted in the valve bore in order to realize a 5/2 way valve function of a 5/3 way valve function.

This or similar types of multiway valves with valve spool arrangement suffer shortcomings as the valve bore extends along the valve housing to accommodate the valve spools in coaxial disposition, so that the valve housing of the multiway valve exhibits a pronounced elongated configuration which is unfavorable and defeats the desire of realizing a compact design of the valve housing.

It would therefore be desirable and advantageous to provide an improved multiway valve to obviate prior art shortcomings and to realize a compact configuration of the valve housing useful for different valve functions.

SUMMARY OF THE INVENTION

According to one aspect of the present invention, a multiway valve for controlling a flow of fluid under pressure, includes a valve housing having fluid ports and a plurality of bores in side-by-side parallel disposition substantially at a same level for accommodating valve spools in one-to-one correspondence, wherein neighboring end faces of the spools are acted upon by actuating means for moving the spools in a longitudinal direction to thereby control a flow of fluid under pressure between the ports, while the opposite end faces interact with a mechanical coupling mechanism secured to the valve housing.

The present invention resolves prior art problems by departing from the conventional teaching of a single continuous valve bore and providing instead several valve bores for respectively accommodating several valve spools which are linked together by a mechanical coupler. As a result, the valve housing can be configured compact. Each valve spool has a defined linkage end face intended to cooperate with the mechanical coupler, and a defined actuation end face intended to interact with the actuating means for axial displacement of the valve spool.

According to another feature of the present invention, the coupling mechanism may be configured as rocker having opposite ends configured for interaction with the coupling end faces of the spools in order to realize a 5/2 way valve function or 5/3 way valve function. As a consequence of the linkage of the spools by the rocker in this fashion, the valve spools are precluded from independently moving relative to one another. Suitably, the ends of the rocker may have a substantially spherical configuration to optimize a force flow as the rocker rests in mid-section against the end faces of the spools. Of course, it is certainly also conceivable to configure the rocker ends in a different manner, so long as the mechanical linkage results in an optimum force flow. Examples include a pointed configuration or arched configuration of the rocker ends.

The multiway valve according to the present invention can be made as part of a valve assembly kit to suit the way valve function to the customer's needs. According to another aspect of the present invention, the coupling mechanism may be replaced by return springs which act, respectively, on the second end faces of the spools in one-to-one correspondence in order to operate the multiway valve with two 3/n way valve functions. The coupling mechanism or the return springs, depending on the selected option, can be accommodated in a common chamber, which is formed in the valve housing and closed by a lid detachably mounted to the valve housing to ensure accessibility and protection against environmental impact.

According to another feature of the present invention, the actuation for each valve spool is configured as a piston-and-cylinder unit, whereby the piston thereof is connected to the first end face of the valve spool and reciprocates in a cylinder formed by the valve housing. The piston may be connected in one piece to the first end face of the spool. The cylinder of the piston-and-cylinder unit thus defines a control chamber, whereby the axial displacement of the valve spool may be implemented through incorporation of a pilot valve for applying a suitable operating pressure in the control chamber. Suitably, the pilot valve may be so secured to a base of the cylinder as to sealingly close the control chamber. The arrangement of the pilot valve on the cylinder housing permits direct access to the valve bore for mounting or dismantling the valve spool, without requiring additional housing components to close the control chamber.

According to another feature of the present invention, at least one control chamber may accommodate a return spring to provide a passive return movement of the spool and thereby eliminate the need to apply a control pressure in the control chamber via a pilot valve. In this case, it is sufficient to admit fluid under pressure into only one control chamber in order to move the valve spools. The return movement is automatic, when the control chamber is vented.

According to another feature of the present invention, the piston may be disposed in axial offset disposition to the spool in order to allow configuration of a partition wall of minimum wall thickness between neighboring the valve bores. The arrangement of the piston upon the valve spool allows configuration of the valve housing with minimum outer dimensions.

As an alternative to the configuration of the actuation in the form of a piston-and-cylinder unit, the actuation of each of the valve spools may also be implemented by a solenoid with an armature movable in a longitudinal direction and interacting with the valve spool for axial displacement.

According to another feature of the present invention, at least the valve housing may be made of plastics through an injection molding process such that the bores are simultaneously formed. In this way, the need for an additional working step to form the bores through a material-removing process is eliminated. Of course, also the valve spool may be made of plastics in an economical manner.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
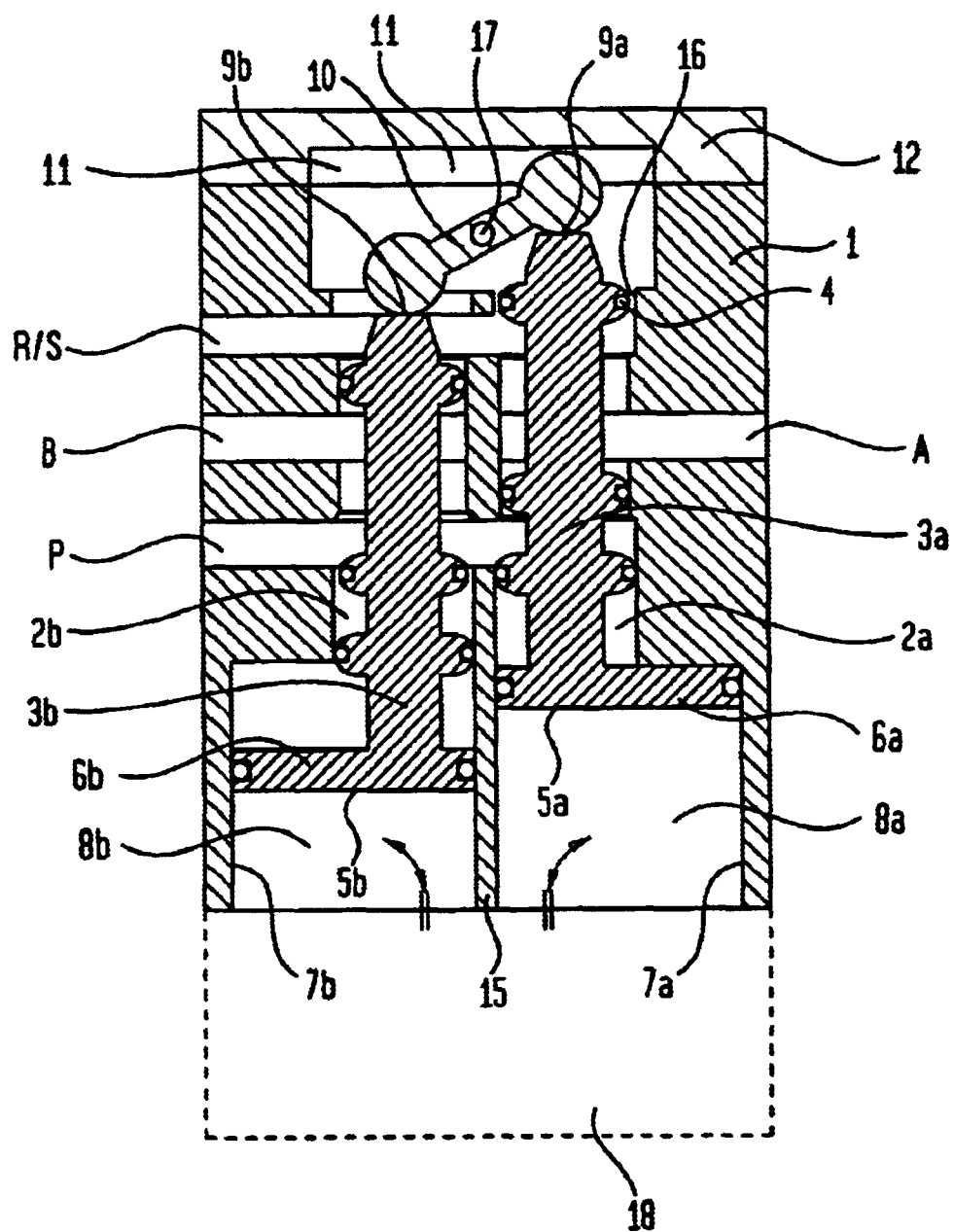
FIG. 1 is a longitudinal section of a first embodiment of a multiway valve according to the present invention for producing a 5/2 way valve function, through provision of two valve spools both acted upon by a control pressure.

Throughout all the Figures, same or corresponding elements are generally indicated by same reference numerals.

Turning now to the drawing, and in particular to FIG. 1, there is shown a longitudinal section of a first embodiment of a multiway valve according to the present invention for producing a 5/2 way valve function. The multiway valve, here, by way of example, a pneumatic multiway valve, includes a valve housing 1 having several outer fluid ports P, A, B, R/S. Formed interiorly of the valve housing 1 at substantially a same level are two valve bores 2a, 2b arranged in parallel side-by-side disposition and separated by a partition wall 15 of the valve housing 1. The bore 2a accommodates a valve spool 3a for movement in a longitudinal direction, and the bore 2b accommodates a valve spool 3b for movement in a longitudinal direction. The valve spools 3a, 3b have each areas of greater diameter and areas of smaller diameter, whereby the areas of greater diameter have anchoring grooves 16 for receiving sealing rings 4 to thereby seal the spools 3a, 3b against the valve housing 1. As the spools 3a, 3b move in longitudinal direction, control edges in the area of the ports A, B, P, R/S are swept by the areas of greater diameter to thereby direct a flow of fluid under pressure between the ports A, B, P, R/S.

The longitudinal movement of the spools 3a, 3b is implemented by respective piston-and-cylinder units, including pistons 6a, 6b and cylinders 7a, 7b. Hereby, each spool 3a, 3b terminates at one end face 5a in a one of the pistons 6a, 6b, whereby the pistons 6a, 6b are formed directly, e.g. in one piece, with the spools 3a, 3b in axial offset disposition thereto. Each of the pistons 6a, 6b is able to reciprocate in the respective cylinder 7a, 7b formed in the valve housing 1 and defining a control chamber 8a, 8b. Pilot valves 18 are sealingly mounted to the valve housing 1 at the base of the cylinder 7a, 7b, respectively, to alternately apply a control pressure in the control chamber 8a, 8b and thereby effect an alternating longitudinal movement of the spools 3a, 3b.

In opposition to the end face 5a, 5b, denoted hereinafter as "actuation end face", each valve spool 3a, 3b has an end face 9a, 9b, denoted hereinafter as "linkage end face". The linkage end faces 9a, 9b interact with a mechanical coupler 10 which is configured as rocker in the nonlimiting example of FIG. 1 to realize a mechanical linkage of movements of both valve spools 3a, 3b. The rocker 10 may be detachably secured to the valve housing 1 in any suitable manner known to the person skilled in the art, so as to allow replacement of the rocker 10, when the multiway valve is part of a valve assembly kit. An example of such an attachment includes the formation of a throughbore 17 in mid-section of the rocker 10 for receiving a fastener such as a pin or the like for securement to the valve housing 1 such as to allow a rocking motion.

The rocker 10 is disposed within a space 11 defined by the valve housing 1 and a lid 12 which is detachably mounted to the valve housing 1. The fluid port R/S is disposed adjacent to the space 11 and is used for venting so as to allow venting of the space 11 across the end of the valve bores 2a, 2b in the contact zone between the valve spools 3a, 3b and the rocker 10.

Figure 2:
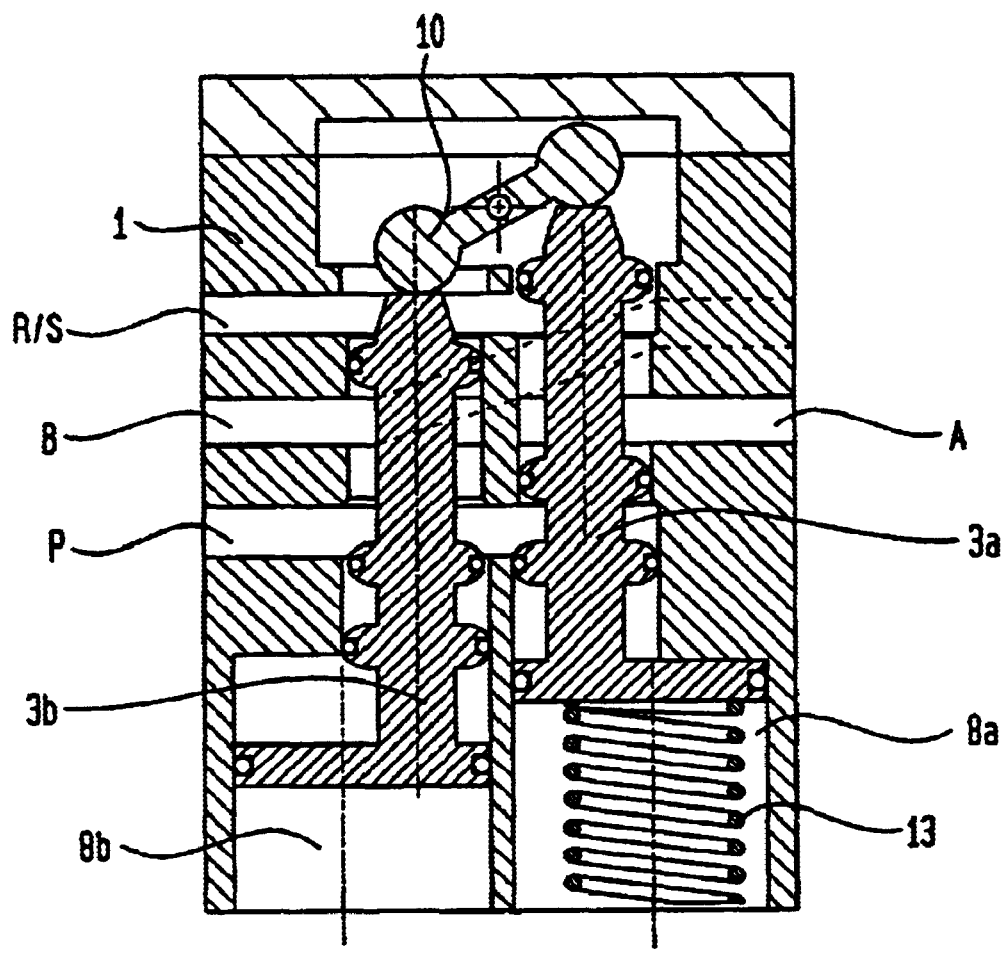
FIG. 2 is a longitudinal section of a second embodiment of a multiway valve according to the present invention for producing a 5/2 way valve function, through provision of two valve spools, only one of which is acted upon by a control pressure.

Referring now to FIG. 2, there is shown a longitudinal section of second embodiment of a multiway valve according to the present invention for producing a 5/2 way valve function. Parts corresponding with those in FIG. 1 are denoted by identical reference numerals and not explained again. In this embodiment, provision is made for the placement of a return spring 13 within the control chamber 8a. As a result, the displacement of both valve spools 3a, 3b in one switching direction is implemented through admission of a fluid under pressure into the control chamber 8b only. Restoring the other switching position is realized by the return spring, thereby establishing a monostable 5/2 way valve function.

Figure 3:
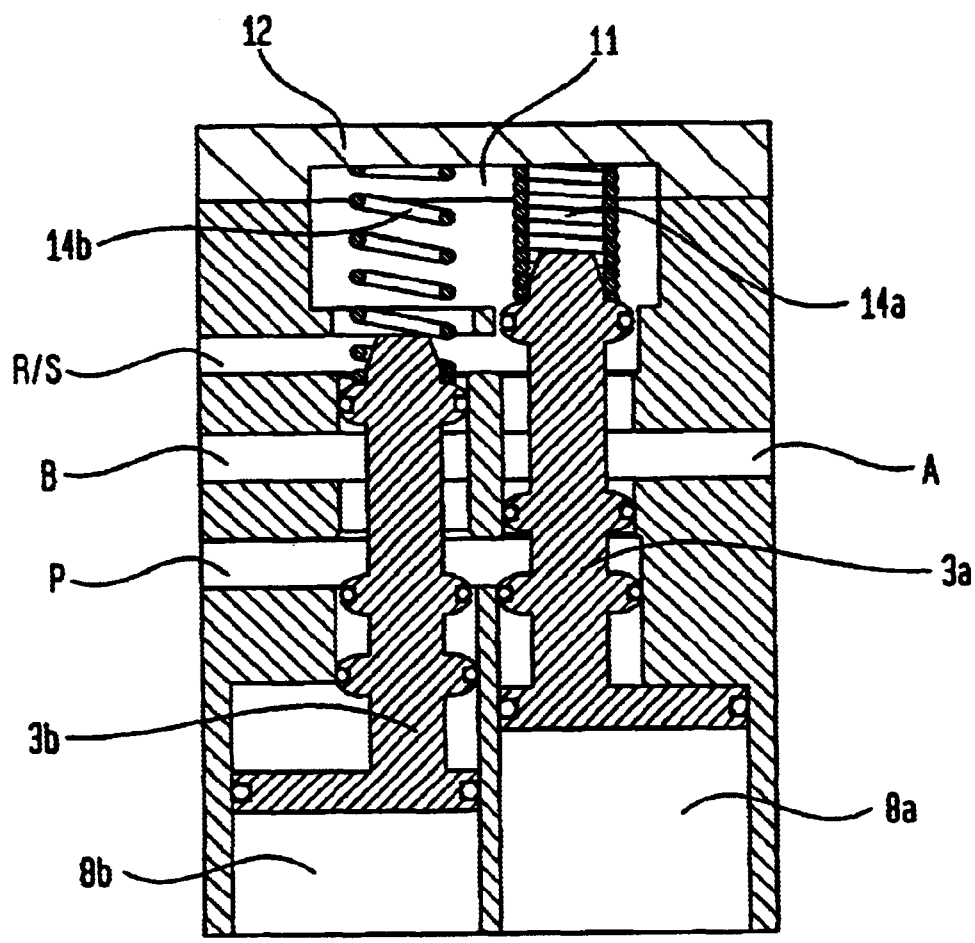
FIG. 3 is a longitudinal section of a third embodiment of a multiway valve according to the present invention for producing two 3/2 way valve functions, through provision of two valve spools both acted upon by a control pressure.

FIG. 3 shows a longitudinal section of a third embodiment of a multiway valve according to the present invention for producing two 3/2 way valve functions. Again, parts corresponding with those in FIG. 1 are denoted by identical reference numerals and not explained again. In this embodiment, provision is made for accommodation of two return springs 14a, 14b within the common space 11, to replace the mechanical coupler 10. The return springs 14a, 14b extend between the lid 12 and a confronting wall section of the uppermost anchoring groove 16 of the valve spools 3a, 3b. In the description, the term "uppermost" will denote a direction toward those portions of the valve assembly which appear on top of FIG. 3.

In contrast to the multiway valve, shown in FIGS. 1 and 2, in which the valve spools 3a, 3b are linked to one another and thus cannot move independently from one another, the multiway valve of FIG. 3 allows a separate switching of the valve spools 3a, 3b as a consequence of the absence of any linkage therebetween. Movement or switching of the valve spools 3a, 3b is realized through independent admission of fluid under pressure into the respective control chambers 8a, 8b.

While the invention has been illustrated and described as embodied in multiway valve for switching a flow of fluid under pressure with parallel disposition of valve bores, and valve assembly kit, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated. For example, it is possible to produce further way valve functions, when, e.g., providing the valve spools with a defined center position. In this case, further spring elements may be placed in the control chambers 8a, 8b or in the space 11 in a manner as described above. Also, the present invention is applicable for a multiway valve that can be configured employing both sealing principles as described above.

What is claimed as new and desired to be protected by Letters Patent is set forth in the appended claims and their equivalents.

What is claimed is:

1. A multiway spool valve for controlling a flow of fluid under pressure, comprising:
    a valve housing having fluid ports and a plurality of bores in side-by-side parallel disposition substantially at a same level;
    a plurality of valve spools, each of the spools being disposed in a corresponding one of the bores of the valve housing, whereby the spools and the bores are placed into one-to-one correspondence, wherein each of the spools has opposite first and second end faces, and portions of greater diameter and portions of smaller diameter;
    actuating means acting on the first end face of the spools for moving the spools in a longitudinal direction to thereby direct a flow of fluid under pressure between the ports;
    a mechanical coupling mechanism secured to the valve housing and interacting with the second end faces of the spools for transferring a driving force generated by the actuating means from one spool to another one of the spools; and
    sealing means for sealing the spools in the bores against the valve housing.

2. The multiway spool valve of claim 1, wherein the coupling mechanism is configured as rocker having opposite ends, with one end configured for interaction with the second end face of one of the spools and with another end configured for interaction with the second end face of another one of the spools in order to realize a 5/2 way valve function or 5/3 way valve function.

3. The multiway spool valve of claim 2, wherein the ends of the rocker have a substantially spherical configuration to rest in mid-section against the end faces of the spools and to thereby ensure an optimum force flow.

4. The multiway valve of claim 1, wherein the coupling mechanism is replaceable by return springs, each of the return springs acting on a corresponding one of the second end faces of the spools, whereby the return springs and the second end faces are placed into one-to-one correspondence in order to selectively realize a 2×3/n way valve function.

5. The multiway valve of claim 4, wherein the valve housing has a chamber for accommodating the coupling mechanism or the return springs, and further comprising a lid detachably mounted to the valve housing for closing the chamber.

6. The multiway spool valve of claim 1, wherein the actuating means includes a plurality of piston-and-cylinder units, each of the piston-and-cylinder units interacting with a corresponding one of the spools, whereby the piston-and-cylinder units and the spools are placed into one-to-one correspondence, wherein each of the piston-and-cylinder units has a piston connected to the first end face of the pertaining spool and reciprocating in a cylinder formed by the valve housing.

7. The multiway spool valve of claim 6, wherein the piston is connected in one piece to the first end face of the spool.

8. The multiway spool valve of claim 6, wherein the cylinder of each of the piston-and-cylinder units defines a control chamber, and further comprising a pilot valve for applying an operating pressure in the control chamber.

9. The multiway spool valve of claim 8, wherein the pilot valve is so secured to a base of the cylinder as to sealingly close the control chamber.

10. The multiway valve of claim 6, wherein the cylinder of each of the piston-and-cylinder units defines a control chamber, and further comprising a return spring for placement in at least one of the control chambers to provide a passive restoration of the spool.

11. The multiway spool valve of claim 6, wherein the piston is disposed in axial offset disposition to the spool in order to allow configuration of a partition wall of minimum wall thickness between corresponding ones of the bores.

12. The multiway spool valve of claim 1, wherein at least the valve housing is made of plastics through an injection molding process.

13. A multiway spool valve for controlling a flow of fluid under pressure, comprising:
    a valve housing having fluid ports and interiorly at least two bores which extend side-by-side and are separated from one another by a partition wall;
    at least two sliding spools, one spool disposed in one of the bores and sealed against the valve housing, and the other spool disposed in the other one of the bores and sealed against the valve housing, wherein the spools have opposite first and second end faces;
    actuating means acting on the first end face of the spools for moving the spool in a longitudinal direction to thereby control a fluid under pressure between the ports; and
    a load-applying mechanism interacting with the second end faces of the spools for transferring a driving force generated by the actuating means from one spool to another one of the spools.

14. The multiway spool valve of claim 13, wherein the load-applying mechanism is a mechanical coupling mechanism secured to the valve housing and interacting with the second end faces of the spools for implementing a 5/2 way valve function or 5/3 way valve function.

* * * * *